United States Patent
Lin

(10) Patent No.: US 11,227,000 B2
(45) Date of Patent: Jan. 18, 2022

(54) METHOD AND APPARATUS FOR OBTAINING AN EXPRESSION FROM CHARACTERS

(71) Applicant: PAI TECH Company Limited, Beijing (CN)

(72) Inventor: Demiao Lin, Beijing (CN)

(73) Assignee: PAI TECH Company Limited, Beijing (CN)

( * ) Notice: Subject to any disclaimer, the term of this patent is extended or adjusted under 35 U.S.C. 154(b) by 957 days.

(21) Appl. No.: 15/947,802

(22) Filed: Apr. 7, 2018

(65) Prior Publication Data

US 2018/0336205 A1    Nov. 22, 2018

(30) Foreign Application Priority Data

May 19, 2017   (CN) .......................... 201710358003.6

(51) Int. Cl.
*G06F 16/33*  (2019.01)
*G06K 9/72*  (2006.01)
(Continued)

(52) U.S. Cl.
CPC .......... *G06F 16/3347* (2019.01); *G06F 16/31* (2019.01); *G06F 16/35* (2019.01);
(Continued)

(58) Field of Classification Search
CPC ...... G06F 16/31; G06F 16/3347; G06F 16/35; G06F 40/253; G06F 40/284; G06F 40/30;
(Continued)

(56) References Cited

U.S. PATENT DOCUMENTS

2011/0029471 A1   2/2011  Chakradhar et al.
2018/0004397 A1*  1/2018  Mazzocchi ........... G06F 3/0488
(Continued)

FOREIGN PATENT DOCUMENTS

| CN | 101416182 A | 4/2009 |
| CN | 106155996 A | 11/2016 |
| CN | 106383817 A | 2/2017 |

OTHER PUBLICATIONS

The first office action for China Application No. 201710358003.6, dated Mar. 26, 2021, 6 pages.
(Continued)

*Primary Examiner* — Shane D Woolwine
(74) *Attorney, Agent, or Firm* — Law Offices of Liaoteng Wang

(57) ABSTRACT

The present disclosure provides a method and an apparatus for obtaining an expression from characters. The method may include: extracting N words under test from a text under test in an arrangement order; inputting an i-th node in the first-level operation, each node of a first node to an i−1 th node in the first-level operation, and a predefined set of operators into a sub-network of a recurrent neural network to obtain nodes of a second-level operation; determining a valid operator in the first-level operation according to the nodes of the second-level operation; performing multi-level operations until the number of valid operators in a M-level operation is determined to be 0 according to the obtained nodes of the M+1-level operation; and generating the expression from the text under test according to valid operators in the first-level operation to the M−1-level operation and words corresponding to valid nodes.

15 Claims, 6 Drawing Sheets

(51) Int. Cl.
*G06N 3/04* (2006.01)
*G06F 16/31* (2019.01)
*G06F 16/35* (2019.01)
*G06N 3/08* (2006.01)
*G06F 40/30* (2020.01)
*G06N 20/10* (2019.01)

(52) U.S. Cl.
CPC .............. *G06F 40/30* (2020.01); *G06K 9/72* (2013.01); *G06N 3/04* (2013.01); *G06N 3/0445* (2013.01); *G06N 3/08* (2013.01); *G06N 20/10* (2019.01)

(58) Field of Classification Search
CPC .. G06K 9/72; G06N 3/02; G06N 3/04; G06N 3/0427; G06N 3/0445; G06N 3/08; G06N 20/00; G06N 20/10; G06N 20/20
See application file for complete search history.

(56) References Cited

U.S. PATENT DOCUMENTS

2018/0114059 A1* 4/2018 Ric ................... G06K 9/00865
2019/0034416 A1* 1/2019 Al Hasan ............. G06N 3/0454

OTHER PUBLICATIONS

Summarization of Natural Language Generation of Jianhua Zhang et al., dated on Aug. 31, 2006, 4 pages.

* cited by examiner

METHOD AND APPARATUS FOR OBTAINING AN EXPRESSION FROM CHARACTERS

CROSS-REFERENCE TO RELATED APPLICATION

This application is based upon and claims priority to Chinese Patent Application No. 201710358003.6, filed on May 19, 2017, the content of which is incorporated herein by reference in its entirety.

TECHNICAL FIELD

The present disclosure relates to the field of artificial intelligence, and more particularly to a method and an apparatus for obtaining an expression from characters.

BACKGROUND

In daily work, study, and life, there are many reports, statements, documents and other texts in which important information may often be some entities in the texts. For example, in the text "23.06 million Yuan was spent on company management fees in Year 2013", the important information of the text may be contained by the entity "Year 2013", the entity "company management fees" and the entity "23.06 million Yuan".

In some texts, some of entities within a multi-element group in the texts are derived based on other entities and relationships described by characters. After a text has been drafted, a staff may have to manually check the text in order to avoid any mistakes in the text. The staff may also need to check or calculate relationships among entities one by one. For example, with respect to the text "The proportions of current assets in total assets during the periods of Year 2013, Year 2014, Year 2015 and January-March, Year 2016 are 18.40%, 19.75%, 15.49% and 11.96%, respectively.", the staff needs to manually summarize expressions after reading the text, so as to calculate the proportion of current assets in total assets during each period and then check with the proportions "18.40%", "19.75%", "15.49%" and "11.96%" in the text. Since the text such as reports, statements, documents, etc. tends to contain a large amount of content, the staff may need to spend a lot of time to complete the checking of the text, thereby resulting in a relatively low efficiency of text checking.

SUMMARY

The present disclosure provides a method and an apparatus for obtaining an expression from characters.

In an aspect, the present disclosure provides a method for obtaining an expression from characters. The method may include: extracting N words under test from a text under test in an arrangement order of the N words under test in the text under test, wherein N word vectors respectively corresponding to the N words under test are used as N nodes of a first-level operation, the text under test includes characters, and the N is an integer greater than 1; inputting an i-th node in the first-level operation, each node of a first node to an i−1 th node in the first-level operation, and a predefined set of operators into a sub-network of a recurrent neural network to obtain nodes of a second-level operation, wherein the nodes of the second-level operation are hidden vectors output by the sub-network in the first-level operation, the set of operators include word vectors of the operators, the i is an integer and $1 \leq i \leq N$ determining a valid operator in the first-level operation according to the nodes of the second-level operation; inputting a j-th node in an M-level operation, each node of a first node to a j−1th node in the M-level operation and the nodes in the first-level operation to an M−1-level operation, and the set of operators into the sub-network of the recurrent neural network to obtain nodes of an M+1-level operation, until a number of valid operators in the M-level operation is determined to be 0 according to the nodes of the M+1-level operation, wherein the nodes of the M+1-level operation are hidden vectors output from the sub-network in the M-level operation, and both the M and the j are integers larger than 1; and generating the expression from the text under test according to valid operators in the first-level operation to the M−1-level operation and words corresponding to valid nodes, wherein the valid nodes are nodes corresponding to the valid operators.

In another aspect, the present disclosure provides an apparatus for obtaining an expression from characters. The apparatus may include: an extraction module configured to extract N words under test from a text under test in an arrangement order of the N words under test in the text under test, wherein N word vectors respectively corresponding to the N words under test are used as N nodes of a first-level operation, the text under test includes characters, and the N is an integer greater than 1; an operation module configured to input an i-th node in the first-level operation, each node of a first node to an i−1 th node in the first-level operation, and a predefined set of operators into a sub-network of a recurrent neural network to obtain nodes of a second-level operation, wherein the nodes of the second-level operation are hidden vectors output by the sub-network in the first-level operation, the set of operators include word vectors of the operators, the i is an integer and $1 \leq i \leq N$; a determination module configured to determine a valid operator in the first-level operation according to the nodes of the second-level operation; the operation module further configured to input a j-th node in an M-level operation, each node of a first node to a j−1th node in the M-level operation and the nodes in the first-level operation to an M−1-level operation, and the set of operators into the sub-network of the recurrent neural network to obtain nodes of an M+1-level operation, until a number of valid operators in the M-level operation is determined to be 0 according to the nodes of the M+1-level operation, wherein the nodes of the M+1-level operation are hidden vectors output from the sub-network in the M-level operation, and both the M and the j are integers larger than 1; and an expression generation module configured to generate the expression from the text under test according to valid operators in the first-level operation to the M−1-level operation and words corresponding to valid nodes, wherein the valid nodes are nodes corresponding to the valid operators.

The present disclosure provides a method and an apparatus for obtaining an expression from characters. N words under test may be extracted from a text under test, and N word vectors respectively corresponding to the N words under test may be used as N nodes of a first-level operation. Any node in the first-level operation, all the preceding nodes before the node in the first-level operation, and a predefined set of operators may be input into a sub-network of a recurrent neural network. Hidden vectors output from the sub-network may be used as nodes of a second-level operation, and valid operators in the first-level operation may be determined according to the nodes of the second-level operation. Then, the j-th node in an M-level operation, each node of the first node to the j−1th node in the M-level operation and the nodes in the first-level operation to an M−1-level operation, and the set of operators may be input into the sub-network of the recurrent neural network to obtain nodes of an M+1-level operation, until the number of valid operators in the M-level operation is determined to be 0. An expression from the text under test may be generated according to the valid operators in the first-level operation to the M−1-level operation and words corresponding to valid nodes.

BRIEF DESCRIPTION OF THE DRAWINGS

To provide a better understanding of the present disclosure, the detailed description is described in conjunction with the accompanying figures, wherein same or similar reference numerals represent same or similar features, in which.

DETAILED DESCRIPTION

Figure 1:
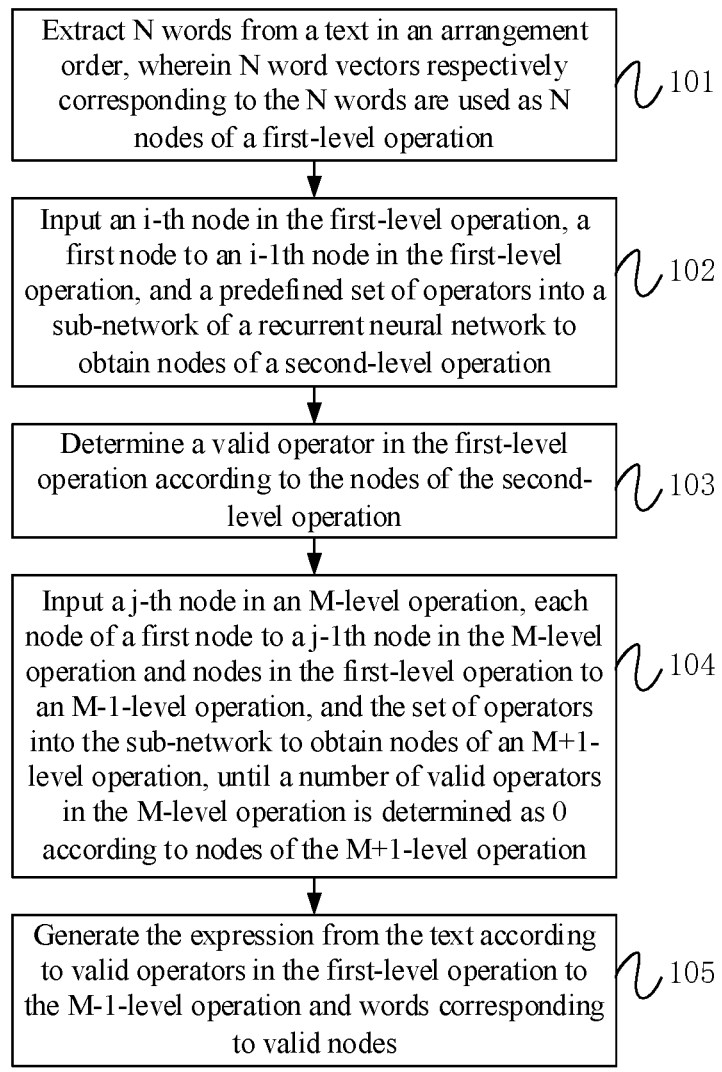
FIG. 1 is a flow chart illustrating a method for obtaining an expression from characters according to an embodiment of the present disclosure.

Various aspects of features and exemplary embodiments of the present disclosure will be described in detail in the following. In the detailed description below, numerous specific details are set forth to provide a thorough understanding of the present disclosure. However, it is obvious to those skilled in the art that the present disclosure can be practiced without some of these specific details. The description of embodiments below is merely to provide a better understanding of the present disclosure by illustrating examples of the present disclosure. The present disclosure is not limited to any specific configuration and algorithm as described below, but instead, covers any modification, replacement and improvement to elements, components, and algorithms without departing from the spirit of the present disclosure. In the drawings and the following description, well known structures and technologies are not illustrated, in order to avoid obscuring the present disclosure.

FIG. 1 is a flow chart illustrating a method for obtaining an expression from characters according to an embodiment of the present disclosure. As shown in FIG. 1, the method for obtaining an expression from characters may include steps 101 to 105.

At step 101, N words under test may be extracted from a text under test in an arrangement order of the N words under test in the text under test, and N word vectors respectively corresponding to the N words under test may be used as N nodes of a first-level operation.

As used herein, the text under test may include characters, and N is an integer greater than one. In an example, word segmentation may be performed on the text under test to obtain one or more words. All the words obtained by the word segmentation may be used as the words under test, or some of the words may be selected as the words under test. Each of the words under test may have its own corresponding word vector. A word vector of a word under test may be used as a node in the first-level operation.

At step 102, the i-th node in the first-level operation, each node of the first node to the i−1 th node in the first-level operation, and a predefined set of operators may be input into a sub-network of a recurrent neural network to obtain nodes of a second-level operation.

The nodes of the second-level operation may be hidden vectors output by the sub-network in the first-level operation. As used herein, the i is an integer and $1 \leq i \leq N$. At step 102, an attempt to obtain an operational relationship between each node and a preceding node in the first level operation may be conducted. The predefined set of operators may include word vectors of one or more operators. It should be noted that the operators may include not only mathematical operators, such as "+", "−", "×", "÷", ">", "<", etc., but also some relational operators such as "inverse subtraction", "inverse division", etc. The operators may also include logic relational operators, such as a certain correspondence relationship. Of course, the operators may also be other types of operators, which are not limited herein.

In an example, if the text under test is "sales in Year 2014 is increased by 500,000 compared to sales in Year 2013", then "sales in Year 2014" and "sales in Year 2013" have a relationship of subtraction in the text under test, i.e. "sales in Year 2014" "−" "sales in Year 2013".

In another example, if the text under test is "sales in Year 2014 is reduced by 500,000 compared to sales in Year 2013", then "sales in Year 2014" and "sales in Year 2013" have a relationship of inverse subtraction in the text under test, i.e. "sales in Year 2013" "−" "sales in Year 2014".

In yet another example, if the text under test is "sales in Year 2014 is increased by 500,000 compared to sales in Year 2013", then "Year 2014" and "sales" have a relationship of correspondence in the text under test.

In an example, for a sub-network in the recurrent neural network, when a node A1, a preceding node A2 before the node A1 and a word vector of an operator from the set of operators are input into the sub-network, the sub-network can output a hidden vector. When the node A1, the preceding node A2 before the node A1 and a word vector of another operator from the set of operators are input into the sub-network, the sub-network can output another hidden vector.

At step 103, a valid operator in the first-level operation may be determined according to the nodes of the second-level operation.

As used herein, a node of the second-level operation may be a hidden vector output from the first-level operation. The hidden vector may indicate whether the relationship between the two nodes input for generating the hidden vector matches the input operator. The hidden vector may also be regarded as a word vector of a combination of the input operator and the two nodes input for generating the hidden vector.

The valid operator is an operator that matches the relationship between the input two nodes. In an embodiment, a machine learning method may be employed to obtain a rule for determining the valid operator in the operation. Then it may be determined whether the nodes in the second-level operation meet the rule. When a certain node in the second-level operation meets the rule, then it may be determined that an operator corresponding to the certain node in the second-level operation is a valid operator in the first-level operation.

At step 104, the j-th node in an M-level operation, each node of the first node to the j−1th node in the M-level operation and the nodes in the first-level operation to an M−1-level operation, and the set of operators may be input into the sub-network of the recurrent neural network to obtain nodes of an M+1-level operation, until the number of valid operators in the M-level operation is determined to be 0 according to the nodes of the M+1-level operation.

As used herein, the nodes of the M+1-level operation are hidden vectors output from the above sub-network in the M-level operation, both M and j are integers larger than 1, and j is less than or equal to the total number of the nodes in the M-level operation. After determining the valid operator in the first-level operation at step 103, the nodes of the second-level operation, the nodes of the first-level operation and the set of operators may be employed to obtain nodes of a third-level operation, and a valid operator in the second-level operation may be determined according to the nodes of the third-level operation, and so on, until there is no valid operator in the obtained M-level operations. The valid operators in the first-level operation to the M−1-level operation may indicate operational relationships among the individual nodes in the first-level operation to the M−1-level operation.

At step 105, an expression from the text under test may be generated according to the valid operators in the first-level operation to the M−1-level operation and words corresponding to valid nodes.

As used herein, a valid node is a node that corresponds to a valid operator. In other words, the valid node is a node that is input into a same sub-network as the valid operator. The valid operators in the first-level operation to the M−1-level operation may indicate the operational relationships among the individual nodes in the first-level operation to the M−1-level operation. The valid nodes may indicate objects that the operational relationships are directed against. Accordingly, the expression from the text under test may be generated according to the valid operators in the first-level operation, the valid operators in the second-level operation, . . . , the valid operators in the M−1-level operation and the words corresponding to the valid nodes. In an example, a word corresponding to a valid node may be a word under test, or a new word generated by a combination of two or more words under test.

For example, the valid operators in the first-level operation may be determined according to the nodes of the second-level operation obtained by the first-level operation. If the number of valid operators in the first-level operation is 0, then the second-level operation may not be needed. If the number of valid operators in the first-level operation is greater than 0, then the second-level operation may be executed. The valid operators in the second-level operation may be determined according to the nodes of the third-level operation obtained by the second-level operation. If the number of valid operators in the second-level operation is 0, then a next level operation may not be needed and the expression from the text under test may be generated according to the valid operators in the first-level operation and the words corresponding to the valid nodes. If the number of valid operators in the second-level operation is greater than 0, then the third-level operation may be executed. The valid operators in the third-level operation may be determined according to the nodes of the fourth-level operation obtained by the third-level operation. If the number of valid operators in the third-level operation is 0, then a next level operation may not be needed and the expression from the text under test may be generated according to the valid operators in the first-level operation, the valid operators in the second-level operation and the words corresponding to the valid nodes. If the number of valid operators in the third-level operation is greater than 0, then the fourth-level operation may be executed. And so on, until the number of valid operators in a certain level operation is determined to be 0, the expression from the text under test may be generated according to the valid operators and the valid nodes in all the preceding level operations before the certain level operation.

In an example, the text under test is "Sales in Year 2014 is increased by 500,000 compared to sales in Year 2013". Seven words under test "sales", "Year 2014", "increased", "500,000", "compared to", "sales", and "Year 2013" may be extracted from the text under test. Word vectors respectively corresponding to the seven words under test may be used as the nodes of the first-level operation. The set of operators may include a subtraction, a correspondence relationship and an equal relationship. After the first-level operation, the nodes of the second-level operation can be obtained. For example, two nodes of the second-level operation are obtained as corresponding to the words under test "Year 2014 sales", "Year 2013 sales". According to the node "Year 2014 sales" in the second-level operation, the operator between "Year 2014" and "sales" can be determined as the valid operator which is the correspondence relationship. Likewise, according to the node "Year 2013 sales" in the second-level operation, the operator between "Year 2013" and "sales" can be determined as the valid operator which is the correspondence relationship. In the second-level operation, a new node can be formed by a combination of the word vectors of both "Year 2014" and "sales", and the word under test corresponding to the node may be represented as "Year 2014 sales". Likewise, a new node can be formed by a combination of the word vectors of both "Year 2013" and "sales", and the word under test corresponding to the node may be represented as "Year 2013 sales". According to the operation among the nodes in the second-level operation and the set of operators in the sub-network of the recurrent neutral network, it may be determined that the "Year 2014 sales" and the "Year 2013 sales" have a relationship of subtraction, and the expression "Year 2014 sales−Year 2013 sales=500,000" can be obtained.

In an example, the recurrent neural network may be referred to as RNN (Recurrent Neural Network). Network parameters of the recurrent neural network may be shared by sub-networks in the recurrent neural network. For example, the network parameters may be parameters of a LSTM (Long Short-Term Memory) unit.

The present disclosure provides a method for obtaining an expression from characters. N words under test may be extracted from a text under test, and N word vectors respectively corresponding to the N words under test may be used as N nodes of a first-level operation. Any node in the first-level operation, all the preceding nodes before the node in the first-level operation, and a predefined set of operators may be input into a sub-network of a recurrent neural network. Hidden vectors output from the sub-network may be used as nodes of a second-level operation, and valid operators in the first-level operation may be determined according to the nodes of the second-level operation. Then, the j-th node in an M-level operation, each node of the first node to the j−1th node in the M-level operation and the nodes in the first-level operation to an M−1-level operation, and the set of operators may be input into the sub-network of the recurrent neural network to obtain nodes of an M+1-level operation, until the number of valid operators in the M-level operation is determined to be 0. An expression from the text under test may be generated according to the valid operators in the first-level operation to the M−1-level operation and words corresponding to valid nodes. Compared with a conventional method that needs to manually summarize expressions, in embodiments of the present disclosure, the words under test in the text under test and the predefined set of operators may be processed by the recurrent neural network, and the expression from the text under test may be summarized according to the determined valid operators and the words corresponding to the valid nodes. No staff needs to spend a lot of time to summarize the expression and then complete text checking. The time spent on the text checking can be reduced and thus the efficiency of the text checking can be increased.

Figure 2:
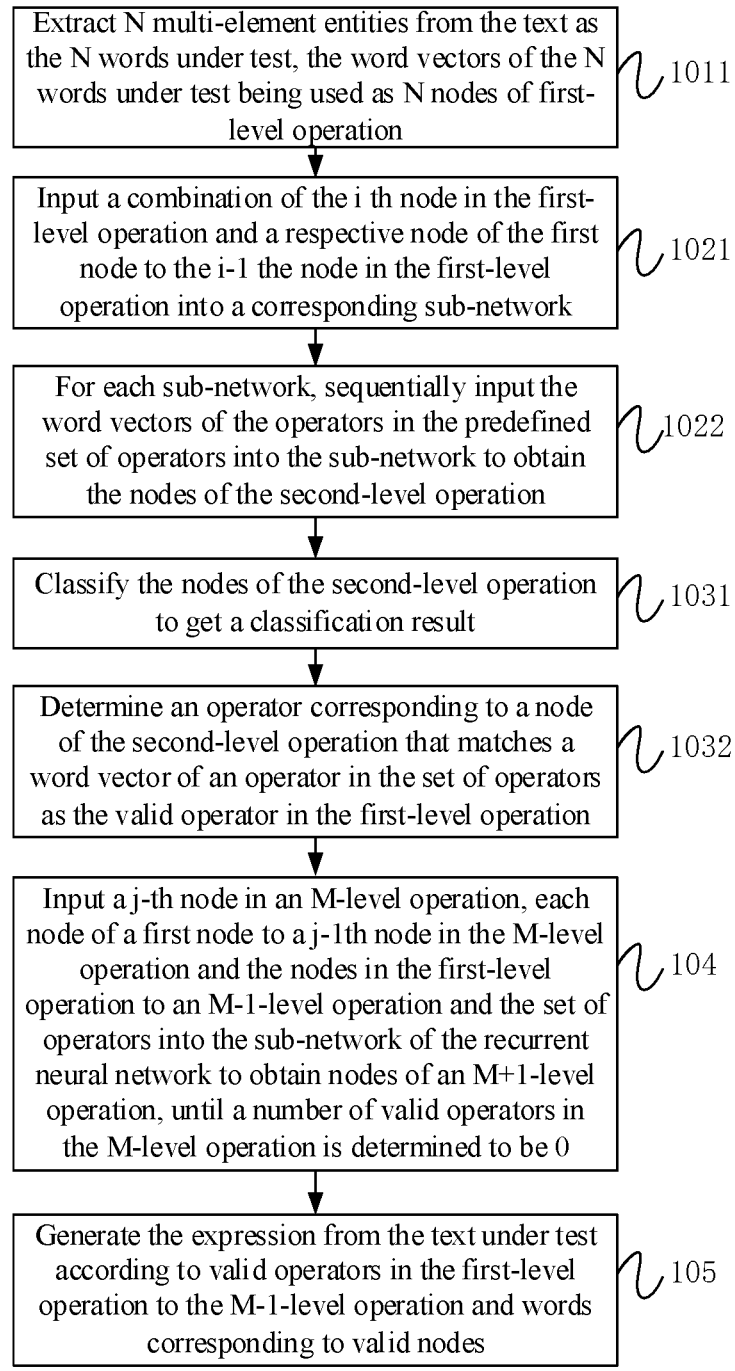
FIG. 2 is a flow chart illustrating a method for obtaining an expression from characters according to another embodiment of the present disclosure.

FIG. 2 is a flow chart illustrating a method for obtaining an expression from characters according to another embodiment of the present disclosure. FIG. 2 is different from FIG. 1 in that step 101 in FIG. 1 may be specifically detailed as step 1011 in FIG. 2, step 102 in FIG. 1 may be specifically detailed as step 1021 and step 1022 in FIG. 2, and step 103 in FIG. 1 may be specifically detailed as step 1031 and step 1032 in FIG. 2.

At step 1011, N multi-element entities may be extracted from the text under test. The N multi-element entities may be used as the N words under test and the word vectors of the N words under test may be used as the N nodes of the first-level operation.

In the embodiment, word segmentation may be performed on the text under test to obtain one or more words. However, among these words obtained by word segmentation, there may be some words having nothing to do with important information in the text under test. The important information in the text under test may be a multi-element entity, such as a time entity, an attribute entity, a value entity, etc. Thus, the multi-element entities may be used as the words under test, and the other words having nothing to do with the important information may be removed.

In an example, the text under test is "The proportions of current assets in total assets during the periods of Year 2013, Year 2014, Year 2015 and January-March, Year 2016 are 18.40%, 19.75%, 15.49% and 11.96%, respectively." The text under test may be segmented into the following words: "The proportions", "of", "current assets", "in", "total assets", "during", "the periods", "of", "Year 2013", "Year 2014", "Year 2015", "and", "January-March, Year 2016", "are", "18.40%", ",", "19.75%", ",", "15.49%", "and", "11.96%", ",", "respectively" and ".". Among these words, the time entities may include "Year 2013", "Year 2014", "Year 2015", and "January-March, Year 2016"; the attribute entities may include "current assets", "total assets", and "proportions"; and the value entities may include "18.40%", "19.75%", "15.49%", and "11.96%". The above time entities, attribute entities and value entities may be used as the words under test.

At step 1021, the i-th node in the first-level operation may be combined with each node of the first node to the i−1 th node in the first-level operation respectively, and a combination of the i-th node in the first-level operation and a respective node of the first node to the i−1 th node in the first-level operation may be input into a corresponding sub-network selected from i−1 sub-networks of the recurrent neural network.

In the embodiment, the step 1021 may be executed for each node in the first-level operation. A sub-network may perform an operation of two nodes and word vectors of operators in the set of operators. For example, there are three nodes in the first-level operation, which are respectively node D1, node D2 and node D3 in order. When i=2, node D2 and node D1 may be input into a sub-network A1. When i=3, node D3 and node D1 may be input into a sub-network A2, and node D3 and node D2 may be input into a sub-network A3.

At step 1022, for each sub-network, the word vectors of the operators in the predefined set of operators may be sequentially input into the sub-network to obtain the nodes of the second-level operation output by the sub-network.

In an example, in the first-level operation, for a sub-network, an operation of two nodes and a word vector of one operator can be performed at a time to obtain one node of the second-level operation. In other words, the number of nodes in the second-level operation output by a sub-network is equal to the number of operators in the predefined set of operators. For example, there are three nodes in the first-level operation, which are respectively node D1, node D2 and node D3 in order. The set of operators include word vectors of two operators. The sub-network A1 may perform an operation according to the node D2, the node D1 and the word vector of the first operator to obtain a node of the second-level operation. The sub-network A1 may also perform an operation according to the node D2, the node D1 and the word vector of the second operator to obtain a node of the second-level operation. In other words, the sub-network A1 may output two nodes of the second-level operation. A node of the second-level operation may indicate the relationship between two nodes of the first-level operation that correspond to the node of the second-level operation.

At step 1031, the nodes of the second-level operation may be classified to get a classification result.

In the embodiment, the classification result may include that the nodes of the first-level operation match a word vector of an operator in the set of operators or the nodes of the first-level operation do not match a word vector of an operator in the set of operators. Through the classification, it can be known whether the relationship between two nodes matches an operator in the set of operators. In an example, the nodes of the second-level operation may be classified using a multi-dimensional classification model, such as a logistic regression classification model. Alternatively, a machine learning model, such as a SVM (Support Vector Machine) model, or a non-machine learning model may also be used to classify a decision vector. In an example, the classification result may be represented by a digit number, e.g. a digit 1 may indicate that the nodes of the first-level operation match a word vector of an operator in the set of operators, and a digit 0 may indicate that the nodes of the first-level operation do not match a word vector of an operator in the set of operators. The classification result may also be represented in other ways, which is not limited herein.

At step 1032, an operator corresponding to a node of the second-level operation that matches a word vector of an operator in the set of operators may be determined as the valid operator in the first-level operation.

In an example, a classification result 1 may indicate that the nodes of the first-level operation match a word vector of an operator in the set of operators, and a classification result 0 may indicate that the nodes of the first-level operation do not match a word vector of an operator in the set of operators. Accordingly, an operator corresponding to a node with the classification result 1 of the second-level operation may be determined as the valid operator of the first-level operation.

In an example, the valid operator of the second-level operation may be obtained as follows. The i-th node in the first-level operation may be combined with each node of the first node to the i-1 th node in the first-level operation respectively, and a combination of the i-th node in the first-level operation and a respective node of the first node to the i-1 th node in the first-level operation may be input into a corresponding sub-network selected from i-1 sub-networks of the recurrent neural network. For each sub-network, the word vectors of the operators in the predefined set of operators may be sequentially input into the sub-network to obtain the nodes of the third-level operation output by the sub-network. The nodes of the third-level operation may be classified to get a classification result. An operator corresponding to a node of the third-level operation that matches a word vector of an operator in the set of operators may be determined as the valid operator in the second-level operation.

For example, there are three nodes in the first-level operation, which are respectively node D1, node D2 and node D3 in order. The set of operators include word vectors of two operators. According to the nodes of the first-level operation and the predefined set of operators, it is assumed that two nodes of the second-level operation are obtained, which are respectively node D4 and node D5 in order. For the second-level operation, the node D4 and the node D1 may be input into a sub-network, the sub-network may perform an operation according to the node D4, the node D1 and the word vector of the first operator to obtain a node of the third-level operation, and the sub-network may perform an operation according to the node D4, the node D1 and the word vector of the second operator to obtain a node of the third-level operation. The node D4 and the node D2 may be input into a sub-network, the sub-network may perform an operation according to the node D4, the node D2 and the word vector of the first operator to obtain a node of the third-level operation, and the sub-network may perform an operation according to the node D4, the node D2 and the word vector of the second operator to obtain a node of the third-level operation. The node D4 and the node D3 may be input into a sub-network, the sub-network may perform an operation according to the node D4, the node D3 and the word vector of the first operator to obtain a node of the third-level operation, and the sub-network may perform an operation according to the node D4, the node D3 and the word vector of the second operator to obtain a node of the third-level operation. The node D5 and the node D1 may be input into a sub-network, the sub-network may perform an operation according to the node D5, the node D1 and the word vector of the first operator to obtain a node of the third-level operation, and the sub-network may perform an operation according to the node D5, the node D1 and the word vector of the second operator to obtain a node of the third-level operation. The node D5 and the node D2 may be input into a sub-network, the sub-network may perform an operation according to the node D5, the node D2 and the word vector of the first operator to obtain a node of the third-level operation, and the sub-network may perform an operation according to the node D5, the node D2 and the word vector of the second operator to obtain a node of the third-level operation. The node D5 and the node D3 may be input into a sub-network, the sub-network may perform an operation according to the node D5, the node D3 and the word vector of the first operator to obtain a node of the third-level operation, and the sub-network may perform an operation according to the node D5, the node D3 and the word vector of the second operator to obtain a node of the third-level operation. The node D5 and the node D4 may be input into a sub-network, the sub-network may perform an operation according to the node D5, the node D4 and the word vector of the first operator to obtain a node of the third-level operation, and the sub-network may perform an operation according to the node D5, the node D4 and the word vector of the second operator to obtain a node of the third-level operation.

Herein, it is noted that the order in which the nodes and the operators may be input into the sub-networks of the recurrent neural network will not be limited herein. In other words, the nodes of a certain level operation, the nodes of operations of previous levels and the set of operators may be input in any order to obtain respective nodes of a next level operation. For example, in the above described example, the node D5 and the node D4 of the second level operation and the word vector of the first operator may be firstly input into the sub-network to obtain a node of the third-level operation, then the node D4 of the second level operation and the node D1 of the first operation and the word vector of the second operator may be input into the sub-network to obtain a node of the third-level operation, and so on.

Also, it is easily understood by those skilled in the art that although the operations in each level are described to include two operands (i.e. two nodes) in the above examples, there may be any number of operands for each operation. In other words, the number of nodes involved in each operation of each level will not be limited in the present application and may be configured according to specific desires or applications. For example, in the above described example, it may be possible to input only one node (e.g. D4) of the second level and a respective operator to the sub-network to obtain a node of the third-level operation, or input two or more nodes (e.g. D4, D2, and D1) and one or more operators to the sub-network to obtain a node of the third-level operation, and so on.

Furthermore, it is noted that the valid operator of the third-level operation, the fourth-level operation, . . . , the M-level operation may be obtained in a similar way to the second-level operation, and details are not repeated herein again.

Figure 3:
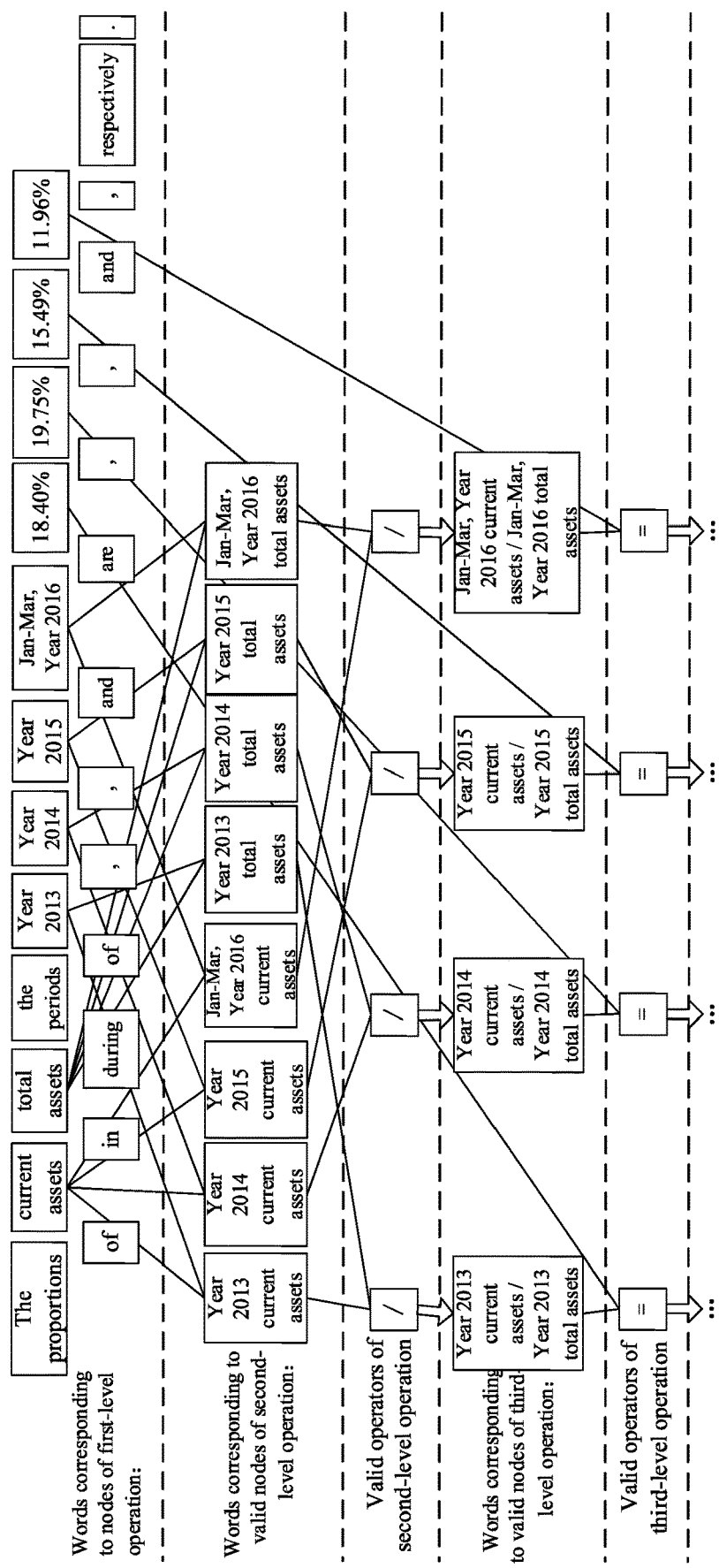
FIG. 3 is an exemplary schematic diagram of an operation in obtaining an expression from characters according to an embodiment of the present disclosure.

FIG. 3 is an exemplary schematic diagram of an operation in obtaining an expression from characters according to an embodiment of the present disclosure. The text under test includes characters "The proportions of current assets in total assets during the periods of Year 2013, Year 2014, Year 2015 and January-March, Year 2016 are 18.40%, 19.75%, 15.49% and 11.96%, respectively." For ease of explanation, the second-level operation in FIG. 3 only indicates valid operators and the words corresponding to valid nodes, and the third-level operation only indicates valid operators and the words corresponding to valid nodes. The valid operator of the first-level operation in FIG. 3 is an operator of correspondence relationship and not shown. As illustrated in FIG. 3, the words corresponding to the valid nodes of the second-level operation obtained after the first-level operation include "Year 2013 current assets", "Year 2014 current assets", "Year 2015 current assets", "January-March, Year 2016 current assets", "Year 2013 total assets", "Year 2014 total assets", "Year 2015 total assets", "January-March, Year 2016 total assets". Taking the word "Year 2013 current assets" corresponding to the node of the second-level operation as an example, the word "Year 2013 current assets" is obtained by a combination of the words "Year 2013" and "current assets" corresponding to the nodes of the first-level operation and the valid operator (in this case, the operator of correspondence relationship) of the first-level operation. Through the second-level operation, the valid operators of the second-level operation may be determined according to the classification result of the nodes of the third-level operation. As shown in FIG. 3, the valid operators of the second-level operation include four "/" (i.e. the division operator). Then the words corresponding to the valid nodes in the third-level operation may be obtained. As illustrated in FIG. 3, the words corresponding to the valid nodes of the third-level operation include "Year 2013 current assets/Year 2013 total assets", "Year 2014 current assets/Year 2014 total assets", "Year 2015 current assets/Year 2015 total assets", "January-March, Year 2016 current assets/January-March, Year 2016 total assets". The valid nodes in the third-level operation, the nodes in the second-level operation and the nodes in the first-level operation may be operated by the sub-networks of the recurrent neural network to obtain the nodes of the fourth-level operation. According to the classification result of the nodes of the fourth-level operation, the valid operators of the third-level operation may be determined as including four "=" (i.e. the equal operator). The number of valid operators in the fourth-level operation is 0, so it is not needed to obtain the nodes in the fifth-level operation based on the operation of the nodes in the fourth-level operation. According to the valid operators of the first-level operation, the valid operators of the second-level operation, the valid operators of the third-level operation and the words corresponding to the valid nodes, four expressions can be obtained respectively as the expression (1) to the expression (4). The expressions are as follows:

Year 2013 current assets/Year 2013 total
assets=18.40%     (1)

Year 2014 current assets/Year 2014 total
assets=19.75%     (2)

Year 2015 current assets/Year 2015 total
assets=15.49%     (3)

January-March,Year 2016 current assets/January-
March,Year 2016 total assets=11.96%     (4)

Figure 4:
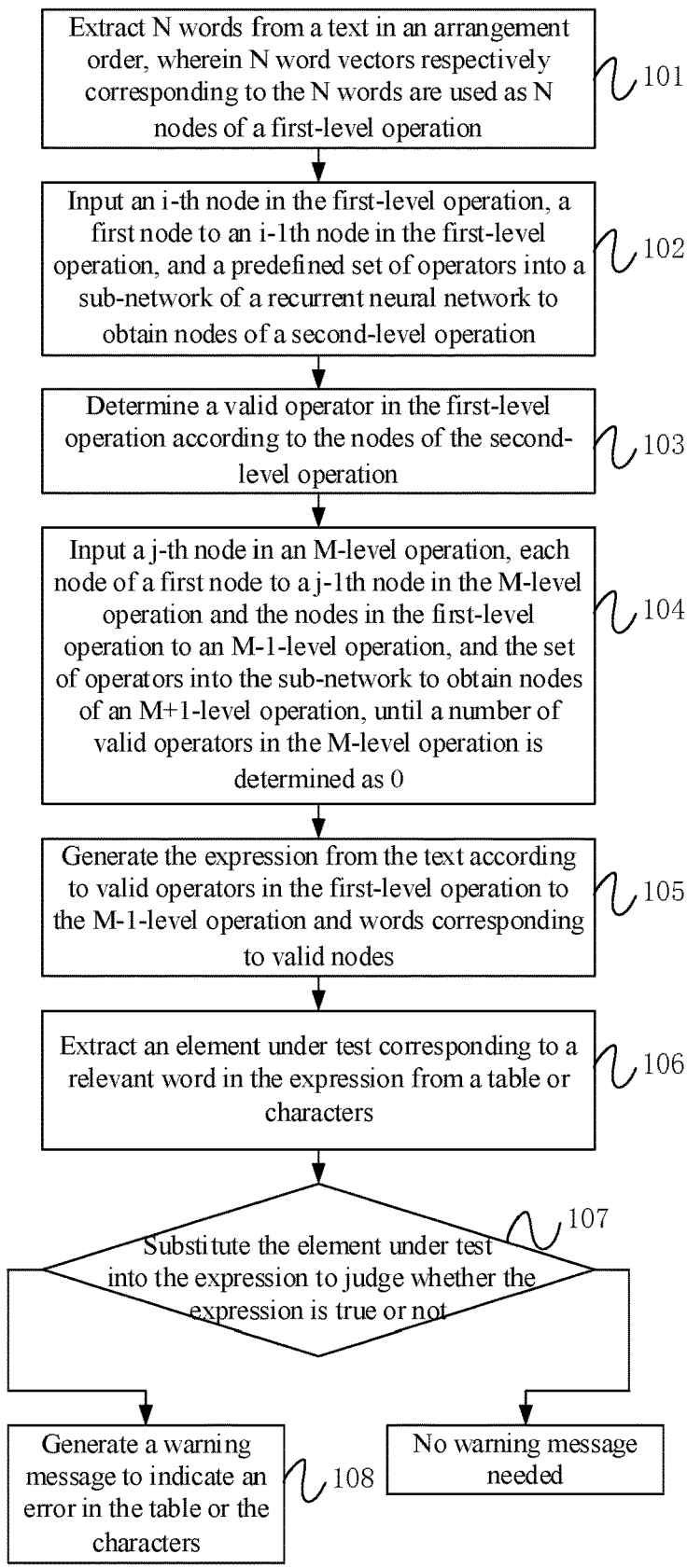
FIG. 4 is a flow chart illustrating a method for obtaining an expression from characters according to yet another embodiment of the present disclosure.

FIG. 4 is a flow chart illustrating a method for obtaining an expression from characters according to yet another embodiment of the present disclosure. FIG. 4 is different from FIG. 1 in that the method further include steps 106 to 108.

At step 106, an element under test corresponding to a relevant word in the expression may be extracted from a table or characters.

In the embodiment, the relevant word is a word corresponding to a valid node in the expression.

In an example, a certain part may be described repeatedly in the text under test. In this case, characters that are extracted from the repeated part and correspond to the relevant word in the expression may be used as the element under test.

In an example, the text under test may include a table. In this case, the element under test corresponding to the relevant word in the expression may be extracted from the table. For example, the text under test includes characters "The proportions of current assets in total assets during the periods of Year 2013, Year 2014, Year 2015 and January-March, Year 2016 are 18.40%, 19.75%, 15.49% and 11.96%, respectively." The text under test also includes a table corresponding to the characters. The table is illustrated as the following Table 1.

TABLE 1

|  | current assets (10,000 Yuan) | total assets (10,000 Yuan) |
| --- | --- | --- |
| Year 2013 | 18.4 | 100 |
| Year 2014 | 25.675 | 130 |
| Year 2015 | 20.36 | 180 |
| January-March, Year 2016 | 7.176 | 60 |

Here, the items in Table 1 are the elements under test corresponding to the relevant words in the expression. The items in Table 1 may be extracted for use by subsequent steps.

At step 107, the element under test may be substituted into the expression to judge whether the expression is true or not when being substituted with the element under test.

Here, a true expression may represent that the operation between the elements under test at both sides of a certain operator completely conforms to the certain operator. A true expression may also represent that the operation between the elements under test at both sides of a certain operator is a little deviated from the certain operator, but the deviation is within an acceptable range, so as to allow that the elements under test may sometimes involve the rounding of some digits or other estimates.

At step 108, if the expression is not true when being substituted with the element under test, a warning message may be generated to indicate an error in the table or characters.

For example, the text under test includes the Table 1. The expressions include the expression (1) to the expression (4). When the elements under test are substituted into the expression (1) to the expression (4), the following expressions (5) to (8) can be obtained.

18.4/100=18.40%     (5)

25.675/130=19.75%     (6)

20.36/180=15.49%     (7)

7.176/60=11.96%     (8)

The expressions (5) to (8) may be calculated by a processor, and the calculated result is that the expression (5), the expression (6) and the expression (8) are true and the expression (7) is not true. Then, a warning message may be generated. The warning message may be an image message, a text message, or a voice message, which is not limited herein. For example, all the elements in the table corresponding to the expression (7) may be marked as red, so that a user can easily search and modify relevant content.

It should be noted that, if the expressions are true when being substituted with the elements under test, the warning message will not be needed.

In the embodiments of the present disclosure, it is possible to perform the checking of data with relatively complex operational relationships between characters and corresponding tables. A manually step-by-step checking is not needed, and the checking of data with relatively complex operational relationships between characters and corresponding tables can be performed by an electronic device.

Thus, the speed of checking can be improved and the accuracy of checking can be increased.

Figure 5:
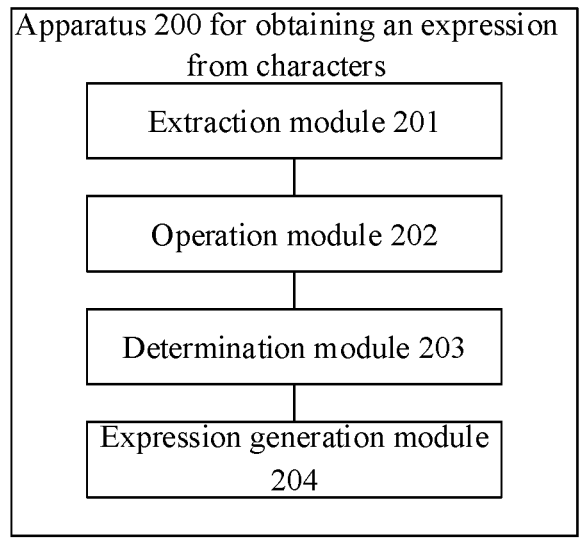
FIG. 5 is a schematic structural diagram of an apparatus for obtaining an expression from characters according to an embodiment of the present disclosure.

FIG. 5 is a schematic structural diagram of an apparatus 200 for obtaining an expression from characters according to an embodiment of the present disclosure. As shown in FIG. 5, the apparatus 200 for obtaining an expression from characters may include an extraction module 201, an operation module 202, a determination module 203 and an expression generation module 204.

In the embodiment, the extraction module 201 may be configured to extract N words under test from a text under test in an arrangement order of the N words under test in the text under test, wherein N word vectors respectively corresponding to the N words under test are used as N nodes of a first-level operation, the text under test includes characters, and the N is an integer greater than 1.

The operation module 202 may be configured to input an i-th node in the first-level operation, each node of a first node to an i−1 th node in the first-level operation, and a predefined set of operators into a sub-network of a recurrent neural network to obtain nodes of a second-level operation, wherein the nodes of the second-level operation are hidden vectors output by the sub-network in the first-level operation, the set of operators include word vectors of the operators, the i is an integer and $1 \leq i \leq N$.

The determination module 203 may be configured to determine a valid operator in the first-level operation according to the nodes of the second-level operation.

The operation module 202 may be further configured to input a j-th node in an M-level operation, each node of a first node to a j−1th node in the M-level operation and the nodes in the first-level operation to an M−1-level operation, and the set of operators into the sub-network of the recurrent neural network to obtain nodes of an M+1-level operation, until a number of valid operators in the M-level operation is determined to be 0 according to the nodes of the M+1-level operation, wherein the nodes of the M+1-level operation are hidden vectors output from the sub-network in the M-level operation, and both the M and the j are integers larger than 1; and j is less than or equal to the total number of the nodes in the M-level operation.

The expression generation module 204 may be configured to generate the expression from the text under test according to valid operators in the first-level operation to the M−1-level operation and words corresponding to valid nodes, wherein the valid nodes are nodes corresponding to the valid operators.

The present disclosure provides an apparatus 200 for obtaining an expression from characters. The extraction module 201 may be configured to extract N words under test from a text under test, wherein N word vectors respectively corresponding to the N words under test may be used as N nodes of a first-level operation. The operation module 202 may be configured to input any node in the first-level operation, all the preceding nodes before the node in the first-level operation, and a predefined set of operators into a sub-network of a recurrent neural network, wherein hidden vectors output from the sub-network may be used as nodes of a second-level operation. The determination module 203 may be configured to determine valid operators in the first-level operation according to the nodes of the second-level operation. In this way, the j-th node in an M-level operation, each node of the first node to the j−1th node in the M-level operation and the nodes in the first-level operation to an M−1-level operation, and the set of operators may be input into the sub-network of the recurrent neural network to obtain nodes of an M+1-level operation, until the number of valid operators in the M-level operation is determined to be 0. The expression generation module 204 may be configured to generate an expression from the text under test according to the valid operators in the first-level operation to the M−1-level operation and words corresponding to valid nodes. Compared with a conventional method that needs to manually summarize expressions, in embodiments of the present disclosure, the words under test in the text under test and the predefined set of operators may be processed by the recurrent neural network, and the expression from the text under test may be summarized according to the determined valid operators and the words corresponding to the valid nodes. No staff needs to spend a lot of time to summarize the expression and then complete text checking. The time spent on the text checking can be reduced and thus the efficiency of the text checking can be increased.

Figure 6:
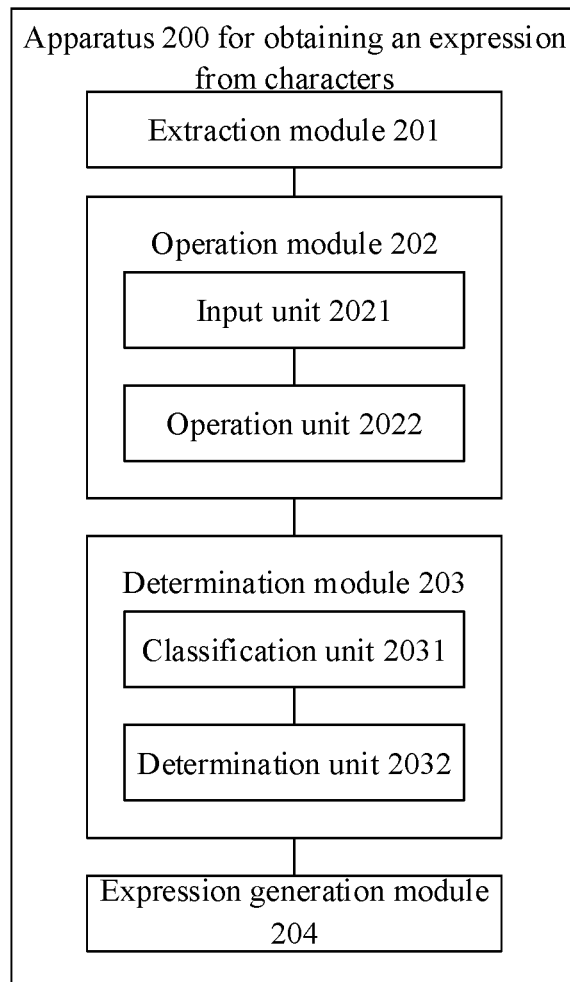
FIG. 6 is a schematic structural diagram of an apparatus for obtaining an expression from characters according to another embodiment of the present disclosure.

FIG. 6 is a schematic structural diagram of an apparatus 200 for obtaining an expression from characters according to another embodiment of the present disclosure. FIG. 6 is different from FIG. 5 in that the operation module 202 in FIG. 6 includes an input unit 2021 and an operation unit 2022, and the determination module 203 in FIG. 6 includes a classification unit 2031 and a determination unit 2032.

The input unit 2021 may be configured to combine the i-th node in the first-level operation and each node of the first node to the i−1 th node in the first-level operation respectively, and input a combination of the i-th node in the first-level operation and a respective node of the first node to the i−1 th node in the first-level operation into a corresponding sub-network selected from i−1 sub-networks of the recurrent neural network.

The operation unit 2022 may be configured to, for each sub-network, sequentially input the word vectors of the operators in the predefined set of operators into the sub-network to obtain the nodes of the second-level operation output by the sub-network.

The classification unit 2031 may be configured to classify the nodes of the second-level operation to get a classification result, wherein the classification result includes that the nodes of the first-level operation match a word vector of an operator in the set of operators or the nodes of the first-level operation do not match a word vector of an operator in the set of operators.

The determination unit 2032 may be configured to determine an operator corresponding to a node of the second-level operation that matches a word vector of an operator in the set of operators as the valid operator in the first-level operation.

It should be noted that the extraction module 201 in the embodiment may be further configured to extract N multi-element entities from the text under test, wherein the N multi-element entities are used as the N words under test.

Figure 7:
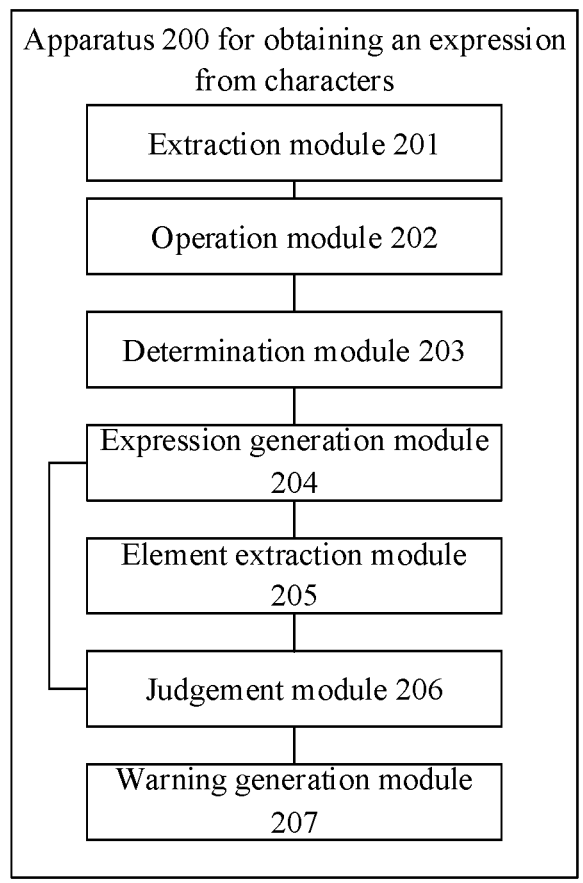
FIG. 7 is a schematic structural diagram of an apparatus for obtaining an expression from characters according to yet another embodiment of the present disclosure.

FIG. 7 is a schematic structural diagram of an apparatus 200 for obtaining an expression from characters according to yet another embodiment of the present disclosure. FIG. 7 is different from FIG. 5 in that the apparatus 200 for obtaining an expression from characters may further include an element extraction module 205, a judgement module 206, and a warning generation module 207.

In the embodiment, the element extraction module 205 may be configured to extract an element under test corresponding to a relevant word in the expression from a table or characters, wherein the relevant word is a word corresponding to a valid node in the expression, and the text under test further include the table.

The judgement module 206 may be configured to substitute the element under test into the expression to judge whether the expression is true or not when being substituted with the element under test.

The warning generation module 207 may be configured to generate a warning message to indicate an error in the table or the characters, if the expression is not true when being substituted with the element under test.

It should be clearly noted that the various embodiments in the specification are all described in a progressive manner. The same or similar parts of the embodiments may be referred to each other, and the difference of an embodiment from another embodiment has been illustrated in detail. For apparatus embodiments, reference may be made to the description of related method embodiments. The invention is not limited to the specific steps and structures described above and shown in the drawings. A person skilled in the art may make various changes, modifications, and additions or change the order of steps after understanding the spirit of the present invention. Also, for the sake of conciseness, the detailed description of known methods and techniques is omitted here.

The functional modules shown in the structural block diagram described above may be implemented as hardware, software, firmware, or a combination thereof. When implemented as hardware, it may be, for example, electronic circuits, application specific integrated circuits (ASICs), suitable firmware, plug-ins, function cards, and so forth. When implemented as software, elements of the present disclosure are programs or code segments that are used to perform required tasks. The programs or code segments may be stored in a machine-readable medium or transmitted over a transmission medium or a communication link via a data signal carried in a carrier wave. The "machine-readable medium" may include any medium capable of storing or transmitting information.

What is claimed is:

1. A method for obtaining an expression from characters, comprising:
   extracting N words under test from a text under test in an arrangement order of the N words under test in the text under test, wherein N word vectors respectively corresponding to the N words under test are used as N nodes of a first-level operation, the text under test includes characters, and the N is an integer greater than 1;
   inputting an i-th node in the first-level operation, each node of a first node to an i−1 th node in the first-level operation, and a predefined set of operators into a sub-network of a recurrent neural network to obtain nodes of a second-level operation, wherein the nodes of the second-level operation are hidden vectors output by the sub-network in the first-level operation, the set of operators include word vectors of the operators, the i is an integer and $1 \leq i \leq N$;
   determining a valid operator in the first-level operation according to the nodes of the second-level operation;
   inputting a j-th node in an M-level operation, each node of a first node to a j−1th node in the M-level operation and the nodes in the first-level operation to an M−1-level operation, and the set of operators into the sub-network of the recurrent neural network to obtain nodes of an M+1-level operation, until a number of valid operators in the M-level operation is determined to be 0 according to the nodes of the M+1-level operation, wherein the nodes of the M+1-level operation are hidden vectors output from the sub-network in the M-level operation, and both the M and the j are integers larger than 1; and
   generating the expression from the text under test according to valid operators in the first-level operation to the M−1-level operation and words corresponding to valid nodes, wherein the valid nodes are nodes corresponding to the valid operators.

2. The method of claim 1, wherein the extracting the N words under test from the text under test comprises:
   extracting N multi-element entities from the text under test, wherein the N multi-element entities are used as the N words under test.

3. The method of claim 1, wherein the inputting the i-th node in the first-level operation, each node of the first node to the i−1 th node in the first-level operation, and the predefined set of operators into the sub-network of the recurrent neural network to obtain the nodes of the second-level operation comprises:
   combining the i-th node in the first-level operation and each node of the first node to the i−1 th node in the first-level operation respectively, and inputting a combination of the i-th node in the first-level operation and a respective node of the first node to the i−1 th node in the first-level operation into a corresponding sub-network selected from i−1 sub-networks of the recurrent neural network; and
   for each sub-network, sequentially inputting the word vectors of the operators in the predefined set of operators into the sub-network to obtain the nodes of the second-level operation output by the sub-network.

4. The method of claim 1, wherein the determining the valid operator in the first-level operation according to the nodes of the second-level operation comprises:
   classifying the nodes of the second-level operation to get a classification result, wherein the classification result includes that the nodes of the first-level operation match a word vector of an operator in the set of operators or the nodes of the first-level operation do not match a word vector of an operator in the set of operators; and
   determining an operator corresponding to a node of the second-level operation that matches a word vector of an operator in the set of operators as the valid operator in the first-level operation.

5. The method of claim 1, further comprises:
   extracting an element under test corresponding to a relevant word in the expression from a table or characters, wherein the relevant word is a word corresponding to a valid node in the expression, and the text under test further include the table;
   substituting the element under test into the expression to judge whether the expression is true or not when being substituted with the element under test; and
   generating a warning message to indicate an error in the table or the characters, if the expression is not true when being substituted with the element under test.

6. An apparatus for obtaining an expression from characters, comprising:
   a processor; and
   a memory configured to store instructions executable by the processor,
   wherein the processor is configured to:
   extract N words under test from a text under test in an arrangement order of the N words under test in the text under test, wherein N word vectors respectively corresponding to the N words under test are used as N nodes of a first-level operation, the text under test includes characters, and the N is an integer greater than 1;

input an i-th node in the first-level operation, each node of a first node to an i−1 th node in the first-level operation, and a predefined set of operators into a sub-network of a recurrent neural network to obtain nodes of a second-level operation, wherein the nodes of the second-level operation are hidden vectors output by the sub-network in the first-level operation, the set of operators include word vectors of the operators, the i is an integer and 1≤i≤N;

determine a valid operator in the first-level operation according to the nodes of the second-level operation;

input a j-th node in an M-level operation, each node of a first node to a j−1th node in the M-level operation and the nodes in the first-level operation to an M−1-level operation, and the set of operators into the sub-network of the recurrent neural network to obtain nodes of an M+1-level operation, until a number of valid operators in the M-level operation is determined to be 0 according to the nodes of the M+1-level operation, wherein the nodes of the M+1-level operation are hidden vectors output from the sub-network in the M-level operation, and both the M and the j are integers larger than 1; and generate the expression from the text under test according to valid operators in the first-level operation to the M−1-level operation and words corresponding to valid nodes, wherein the valid nodes are nodes corresponding to the valid operators.

7. The apparatus of claim 6, wherein the processor is further configured to:

extract N multi-element entities from the text under test, wherein the N multi-element entities are used as the N words under test.

8. The apparatus of claim 6, wherein the processor is further configured to:

combine the i-th node in the first-level operation and each node of the first node to the i−1 th node in the first-level operation respectively, and input a combination of the i-th node in the first-level operation and a respective node of the first node to the i−1 th node in the first-level operation into a corresponding sub-network selected from i−1 sub-networks of the recurrent neural network; and for each sub-network, sequentially input the word vectors of the operators in the predefined set of operators into the sub-network to obtain the nodes of the second-level operation output by the sub-network.

9. The apparatus of claim 6, wherein the processor is further configured to:

classify the nodes of the second-level operation to get a classification result, wherein the classification result includes that the nodes of the first-level operation match a word vector of an operator in the set of operators or the nodes of the first-level operation do not match a word vector of an operator in the set of operators; and determine an operator corresponding to a node of the second-level operation that matches a word vector of an operator in the set of operators as the valid operator in the first-level operation.

10. The apparatus of claim 6, wherein the processor is further configured to:

extract an element under test corresponding to a relevant word in the expression from a table or characters, wherein the relevant word is a word corresponding to a valid node in the expression, and the text under test further include the table;

substitute the element under test into the expression to judge whether the expression is true or not when being substituted with the element under test; and generate a warning message to indicate an error in the table or the characters, if the expression is not true when being substituted with the element under test.

11. A non-transitory computer-readable storage medium having stored therein instructions that, when executed by a processor, causes the processor to perform a method for obtaining an expression from characters, the method comprising:

extracting N words under test from a text under test in an arrangement order of the N words under test in the text under test, wherein N word vectors respectively corresponding to the N words under test are used as N nodes of a first-level operation, the text under test includes characters, and the N is an integer greater than 1;

inputting an i-th node in the first-level operation, each node of a first node to an i−1 th node in the first-level operation, and a predefined set of operators into a sub-network of a recurrent neural network to obtain nodes of a second-level operation, wherein the nodes of the second-level operation are hidden vectors output by the sub-network in the first-level operation, the set of operators include word vectors of the operators, the i is an integer and 1≤i≤N;

determining a valid operator in the first-level operation according to the nodes of the second-level operation;

inputting a j-th node in an M-level operation, each node of a first node to a j−1th node in the M-level operation and the nodes in the first-level operation to an M−1-level operation, and the set of operators into the sub-network of the recurrent neural network to obtain nodes of an M+1-level operation, until a number of valid operators in the M-level operation is determined to be 0 according to the nodes of the M+1-level operation, wherein the nodes of the M+1-level operation are hidden vectors output from the sub-network in the M-level operation, and both the M and the j are integers larger than 1; and generating the expression from the text under test according to valid operators in the first-level operation to the M−1-level operation and words corresponding to valid nodes, wherein the valid nodes are nodes corresponding to the valid operators.

12. The non-transitory computer-readable storage medium of claim 11, wherein the extracting the N words under test from the text under test comprises:

extracting N multi-element entities from the text under test, wherein the N multi-element entities are used as the N words under test.

13. The non-transitory computer-readable storage medium of claim 11, wherein the inputting the i-th node in the first-level operation, each node of the first node to the i−1 th node in the first-level operation, and the predefined set of operators into the sub-network of the recurrent neural network to obtain the nodes of the second-level operation comprises:

combining the i-th node in the first-level operation and each node of the first node to the i−1 th node in the first-level operation respectively, and inputting a combination of the i-th node in the first-level operation and a respective node of the first node to the i−1 th node in the first-level operation into a corresponding sub-network selected from i−1 sub-networks of the recurrent neural network; and for each sub-network, sequentially inputting the word vectors of the operators in the predefined set of operators into the sub-network to obtain the nodes of the second-level operation output by the sub-network.

14. The non-transitory computer-readable storage medium of claim 11, wherein the determining the valid operator in the first-level operation according to the nodes of the second-level operation comprises:

classifying the nodes of the second-level operation to get a classification result, wherein the classification result includes that the nodes of the first-level operation match a word vector of an operator in the set of operators or the nodes of the first-level operation do not match a word vector of an operator in the set of operators; and determining an operator corresponding to a node of the second-level operation that matches a word vector of an operator in the set of operators as the valid operator in the first-level operation.

15. The non-transitory computer-readable storage medium of claim 11, wherein the method further comprises:

extracting an element under test corresponding to a relevant word in the expression from a table or characters, wherein the relevant word is a word corresponding to a valid node in the expression, and the text under test further include the table;

substituting the element under test into the expression to judge whether the expression is true or not when being substituted with the element under test; and generating a warning message to indicate an error in the table or the characters, if the expression is not true when being substituted with the element under test.

* * * * *